Aug. 21, 1928.  
J. T. LINDAHL  
1,681,737  
PEELING MACHINE FOR POTATOES AND THE LIKE  
Filed Jan. 7, 1927
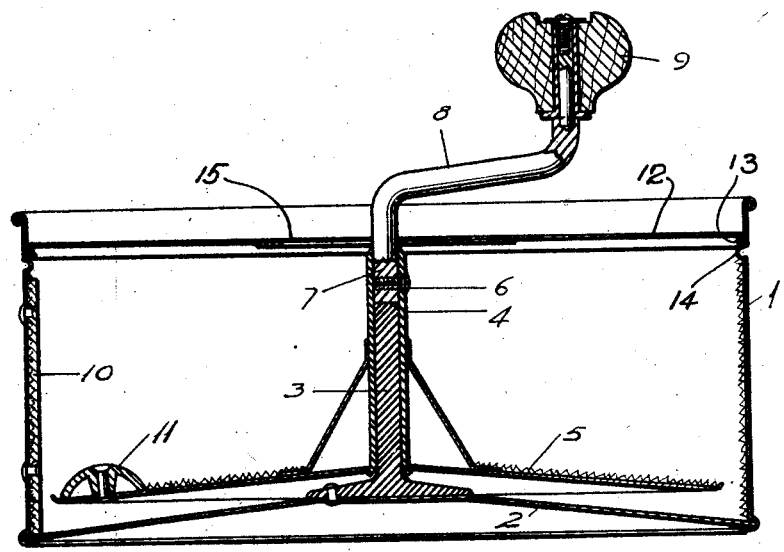
INVENTOR  
JOHN TEODOR LINDAHL  
BY  
ATTORNEY Patented Aug. 21, 1928.

1,681,737

UNITED STATES PATENT OFFICE.

JOHN TEODOR LINDAHL, OF STOCKHOLM, SWEDEN.

PEELING MACHINE FOR POTATOES AND THE LIKE.

Application filed January 7, 1927, Serial No. 159,663, and in Sweden June 2, 1926.

In peeling machines for potatoes and the like, consisting of a rotating supporting disc or drum, by means of which the potatoes are brought into a rolling movement against a surrounding container, the inside of which is coated with any rubbing mass or arranged to operate as a rasp, the shaft supporting the said disc or drum usually is journalled in the bottom of the container and at its upper end guided by a rod or the like, fixed on the upper edge of the said container. Such a construction, however, is not suitable especially because the said rod must be removed from the container, when the disc or drum is to be taken out for cleaning, repair or change. This inconvenience is overcome by my invention, which permits the removal of the rotating disc or drum together with the crank, by which it is rotated, simply by lifting it up from the container and as simply putting it down again after cleaning or repair.

The construction is illustrated in the accompanying drawing showing such a potato peeling machine in a vertical section.

The bottom 2 of the container 1 has a conical shape, sloping against the circumference, and is provided with a central stud or stem 3 for a tube 4 supporting a rubbing or rasping disc 5 which is also preferably made conical, as shown in the figure. In the upper end of the tube 4 the crank shaft 7 is fixed by means of a pin 6. The crank 8 of the crank-shaft is provided with a handle 9. The crank-shaft 7 bears loosely against the stud 3, the distance between the bottom 2 and the disc 5 thus being dependent upon the depth to which the shaft 7 projects in the tube 4.

For removing the disc 5 from the container it will only be necessary to lift the crank 8 or its handle 9 as clearly understood.

When the disc 5 is introduced in the container 1 the edge of the disc 5 is prevented from coming into contact with the inside of the container and thereby to damage its rubbing coating, by means of axially inwardly projecting ribs 10 on the said inside. Should the disc 5 at its insertion in the container and before the tube 4 has been fitted upon the stud 3, occupy an inclined position in relation to the axis of the container its edge will strike one or more of the said ribs, which thus guide it and prevent it from any contact with the inside coating.

The disc 5, if desired, may be provided with one or more projections 11 or other means for causing the potatoes to partake in the rotation of the disc. The container 1 is provided with a cover 12 having a downward flange 13 which rests on the inward projection 14 of the container 1, the cover 12 having a central opening 15 therein.

Having now particularly described the nature of my invention and the manner of its operation, what I claim is:

1. A peeling machine for potatoes and the like comprising a drum, grinding means on the inside of said drum, a conical bottom in said drum, a vertical stem fixed at the center of said bottom, a tube pivotably mounted on said stem, a conical disc fixed at the lower end of the said tube, grinding means on the upper side of the said disc, a crankshaft provided with a crank and a handle, means for detachably fixing the said shaft to the upper part of the said tube, the lower end of the said shaft bearing against the upper end of the stem, a loose cover plate in the upper part of the drum and a central opening in said cover for permitting it to be removed without removing the rotating parts.

2. A peeling machine for potatoes and the like comprising a drum, grinding means on the inside of said drum, a conical bottom in said drum, a vertical stem fixed at the center of said bottom, a tube pivotably mounted on said stem, a conical disc fixed at the lower end of the said tube, grinding means on the upper side of the said disc, a crankshaft provided with a crank and a handle, means for detachably fixing the said shaft to the upper part of the said tube, the lower end of the said shaft bearing against the upper end of the stem, a conical bracket between the tube and the central part of the disc for preventing the potatoes lodging immediately around the tube, a loose cover plate in the upper part of the drum and a central opening in said cover for permitting it to be removed without removing the rotating parts.

JOHN TEODOR LINDAHL.